Patented May 23, 1950

2,508,596

UNITED STATES PATENT OFFICE 2,508,596

SEALING AND ANTISEIZE PIPE JOINT COMPOUND

Clarence H. Cox, Clayton, Mo.

No Drawing. Application September 1, 1948, Serial No. 47,335

4 Claims. (Cl. 252—29)

This invention relates to a pipe joint compound.

An object of the invention is to provide a pipe joint compound which will be superior in sealing and anti-seize properties and which when the invention is practiced in its most efficient manner will meet the rigid requirements, for instance, of an oxygen system employing pressures up to 2000 p. s. i. These requirements include safety factors, exclusion or resistance to corrosion, inflammability, oxidation and toxicity. To meet the requirements such a compound should include adaptability, while maintaining its sealing properties, to wide and repeated temperature variations.

While the scope of the invention is defined in the appended claims, a joint compound embodying this invention comprises a pigment carried in a vehicle which includes chlorinated diphenyl and a solvent therefor. The preferred embodiment of the invention developed and selected by repeated experiments is a compound comprising a pigment consisting of powdered graphite carried in a vehicle including chlorinated diphenyl having the consistency of viscous oil and a solvent therefor, consisting of tetrachlorethylene ($CCl_2:CCl_2$); in the proportion of approximately 52% graphite, 35% chlorinated diphenyl, and 13% tetrachlorethylene, by weight.

The chlorinated diphenyl is a commercial product available on the market under the trade name "Aroclors," and is described together with a method of manufacture in Patent No. 1,892,397, issued to R. L. Jenkins, December 27, 1932. As disclosed in that patent and as known in the industry, the properties of chlorinated diphenyl vary with respect to liquidity or solidity with the degree of chlorination. It varies from a very light mobile liquid through a viscous oil to a solid having a crystalline fracture. For the purpose of this invention chlorinated diphenyl having the consistency of viscous oil is preferred.

Chlorinated diphenyl is non-oxidizing, of low volatility, and non-corrosive to metals. The liquid or viscous product is soluble in most of the common organic solvents but is insoluble in water, glycerine, other glycols and in the lower molecular weight alcohols.

In providing a vehicle, a number of solvents for the chlorinated diphenyl are available. In particular, a large number of chlorinated hydrocarbons may be used including, carbontetrachloride, trichlorethylene, perchlorethylene and ethylene dichloride. Of these, however, one of those named, tetrachlorethylene ($CCl_2:CCl_2$), also termed perchlorethylene, is far superior to the others especially in relation to their safety factors. The following are the constituents of a preferred embodiment which has shown its excellency and superiority after repeated experiments:

75 pounds powdered graphite
50 pounds chlorinated diphenyl having the consistency of viscous oil
18¾ pounds tetrachlorethylene ($CCl_2:CCl_2$)
14 ounces pine oil (the small amount of pine oil is added merely as an aid in mixing)

Tests have been made with this composition in an oxygen system employing a pressure of 2000 p. s. i. These tests have indicated that the composition has the required safety factors. It has successfully passed tests for corrosion, inflammability, oxidation, and toxicity. It is found to correctly seal joints under this pressure and within a wide range of temperatures from —65° F. to 160° F. and after repeated heating and cooling within that temperature range. It has also been shown to have the proper anti-seize characteristics in that in no case was the disassembly torque greater than 10% of the original assembly torque.

While the utility of this invention has been discussed in connection with its use in an oxygen system, its utility of course is not limited to such an installation but can be used with systems handling an infinite number of fluids. Its suggested uses may include systems handling ammonia, nitrogen and acetylene.

It will be apparent from the foregoing description that the invention accomplishes its objects. Various changes in proportions and substitutions of materials with reference to the preferred embodiment may be employed within the scope of the appended claims, while retaining some or all of the advantages of the invention; and improvements may be added without departing from the invention.

I claim:

1. A joint compound comprising a pigment consisting of powdered graphite, and a vehicle including chlorinated diphenyl and a solvent therefor consisting of a chlorinated hydrocarbon, the pigment and vehicle being in the proportion of approximately 52% and 48%, respectively, by weight.

2. A joint compound comprising a pigment consisting of powdered graphite, and a vehicle including chlorinated diphenyl and a solvent therefor consisting of tetrachlorethylene, the pigment and vehicle being in the proportion of approximately 52% and 48%, respectively, by weight.

3. A joint compound comprising a pigment consisting of powdered graphite, and a vehicle including chlorinated diphenyl having the consistency of a viscous oil and a solvent thereof consisting of tetrachlorethylene all in the proportion of approximately 52% pigment, 35% chlorinated diphenyl and 13% solvent, respectively, by weight.

4. A joint compound comprising a pigment consisting of powdered graphite, and a vehicle including chlorinated diphenyl having the consistency of a viscous oil and a solvent thereof consisting of tetrachlorethylene, all in the proportion of approximately 52% graphite, 35% chlorinated diphenyl, and 13% tetrachlorethylene, by weight.

CLARENCE H. COX.

REFERENCES CITED

The following references are of record in the file of this patent:

UNITED STATES PATENTS

| Number | Name | Date |
| --- | --- | --- |
| Re. 22,985 | Collins | Mar. 16, 1948 |
| 1,857,235 | Burton | May 10, 1932 |
| 2,044,176 | McCulloch | June 16, 1936 |